Oct. 2, 1923.

B. HILL

FRYING PAN

Filed Sept. 8, 1921

1,469,318

Benjamin Hill, Inventor

By *James L. Norris*
Attorney

Patented Oct. 2, 1923.

1,469,318

UNITED STATES PATENT OFFICE.

BENJAMIN HILL, OF CLEVELAND, OHIO; JAMES WILBURT DEETRICK EXECUTOR OF SAID BENJAMIN HILL, DECEASED.

FRYING PAN.

Application filed September 8, 1921. Serial No. 499,144.

*To all whom it may concern:*

Be it known that I, BENJAMIN HILL, a citizen of the United States, residing at Cleveland, in the county of Cuyahoga and State of Ohio, have invented new and useful Improvements in Frying Pans, of which the following is a specification.

This invention relates to frying pans and particularly to a pan of the type in which the bottom thereof is depressed forming recesses or compartments of an appropriate size into which individual portions of food may be placed and retained while cooking.

One of the objects of the invention is the construction of a pan in which less than the whole number of compartments may be used if desired and having means by which the surplus grease or other frying liquid may be poured from any one or a number of the compartments in use without spilling the same into the compartment or compartments not in use.

Another object of the invention is the provision of a frying pan having an upturned peripheral flange and having the bottom thereof depressed into elongated recesses or compartments each having an end thereof adjacent the peripheral flange, said flange being constructed with pouring lips each of which is common to the adjacent ends of a plurality of compartments.

Another object of the invention is the provision of a frying pan having individual compartments depressed in the bottom thereof and a peripheral flange upstanding from the bottom of the pan whereby the latter may be filled with liquid above the level of the individual compartments for frying unapportioned quantities of food and for soaking the pan for the purpose of cleansing it.

Another object of the invention is to provide a pan of the character described having individual lids for the several compartments.

Additional objects of the invention will appear in the following specification in which the preferred form of my invention is disclosed.

In the drawings similar reference characters refer to similar parts in all the views in which:—

Figures 1, 2, 3:
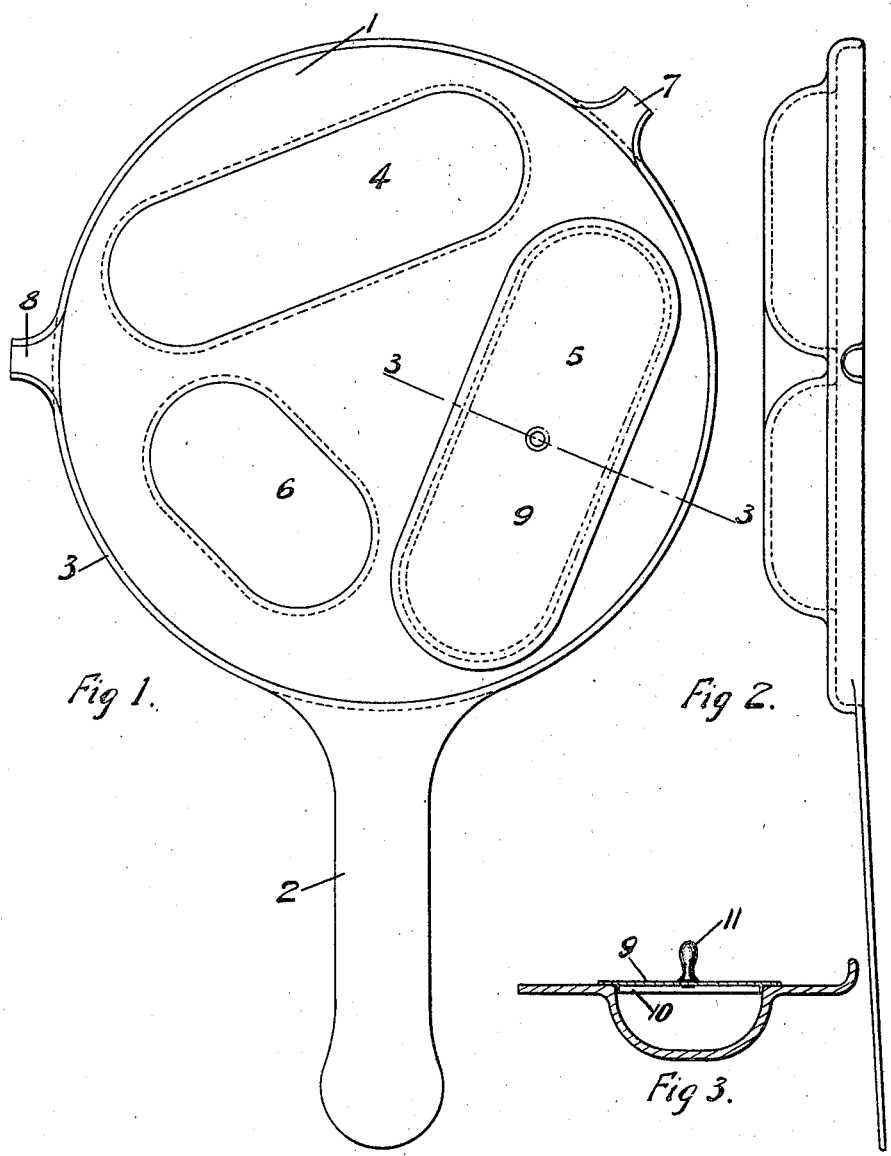
Figure 1 is a plan view of a frying pan embodying my invention.
Figure 2 is a side elevation of the same pan.
Figure 3 is a cross section of one compartment showing the lid, taken along the line 3—3 of Figure 1.

In the drawings, the numeral 1 represents the bottom of the pan having attached thereto a handle 2 and provided with the upturned peripheral flange 3. In the particular embodiment shown the pan is designed for frying eggs, for which purpose the flat portion of the bottom 1 is depressed forming elongated recesses or compartments 4, 5 and 6 the smallest one of which is adapted to hold the contents of one egg shell, and each of the large compartments 4 and 5 to hold double that quantity. These compartments are of convenient depth as indicated in Figure 2 and are devoid of corners and angular portions being smoothly curved throughout to permit the uniform distribution of grease as well as to facilitate the removal of the cooked article therefrom.

The elongated compartments are so arranged relative to the peripheral flange 3 that at least one end of each compartment lies adjacent said peripheral flange, and the compartments are so arranged with relation to one another that the outer ends of adjacent compartments lie close to one another and in operative relation to pouring lips 7 and 8 with which the peripheral flange is provided. These pouring lips are of the minimum number necessary to serve all of the compartments. In the present embodiment there are three compartments, the outer ends of the compartments 4 and 6 being served by the pouring lip 8 and the outer ends of compartments 4 and 5 by the lip 7. By this construction it is obvious that should any one or any two of the compartments be used the surplus grease may be poured out from the lip adjacent said compartment or compartments without being spilled into the compartment not in use.

Each of the compartments is provided with an individual lid 9 one of which is shown in Figures 1 and 3, said lid being provided with a flange 10 entering said compartment and positioning said lid, and a handle 11 by which the lid is removed.

In operation the device is used by breaking the eggs into appropriate compartments say, two eggs in compartment 4 and one egg in compartment 6. When the eggs are done they are removed from the compartments by a special scoop or spoon which is not shown as it does not form a part of the present invention. The surplus grease in the compartment 4 may be poured out by tilting the pan by means of the handle 2, inclining the ends of said compartments either toward the lip 7 or the lip 8. If compartments 4 and 6 have been used the pan is tilted toward the pouring lip 8. Should it be desirable to use the pan for frying an unapportioned quantity of food, the peripheral flange makes it possible to fill the pan with frying liquid above the level of the individual compartments. When it is necessary for cleansing purposes to let the pan soak it may be filled with water above the level of said individual compartments.

Although I have thus described the preferred embodiment of my invention as a round pan having three elongated compartments it is evident that those skilled in the art to which this relates may make the pan any desired shape and may provide any number of individual compartments as may be found to be advantageous. It is therefore to be understood that this invention is not limited to the specific construction herein described.

Having described my invention what I claim as new and desire to secure by Letters Patent, is:—

1. A frying pan comprising a flat bottom portion having an upturned peripheral flange, the bottom portion being provided with a plurality of depressed elongated compartments, an outer end of each compartment lying adjacent said peripheral flange, the latter being provided with a pouring lip and said compartments being arranged angularly in a group with the outer ends of the compartments adjacent to and in operative relation to said pouring lip.

2. A frying pan comprising a bottom portion having an upturned peripheral flange and provided with a handle and with pouring lips on both sides of the axis of said handle, said bottom portion being provided with a plurality of elongated depressed compartments, said compartments being grouped so that the outer ends of a plurality of compartments lie angularly adjacent each of said pouring lips and in operative relation thereto.

3. A frying pan comprising a bottom portion having an upturned peripheral flange and provided with a handle and with pouring lips on both sides of the axis of said handle, said bottom portion being provided with a plurality of elongated depressed compartments, said compartments being grouped so that the outer ends of a plurality of compartments lie adjacent each of said pouring lips and in operative relation thereto, and an individual lid for each compartment.

In testimony whereof I have hereunto set my hand in presence of two subscribing witnesses.

BENJAMIN HILL.

Witnesses:
 RAY T. MILLER,
 H. A. FENWINKEL.